Patented July 10, 1951

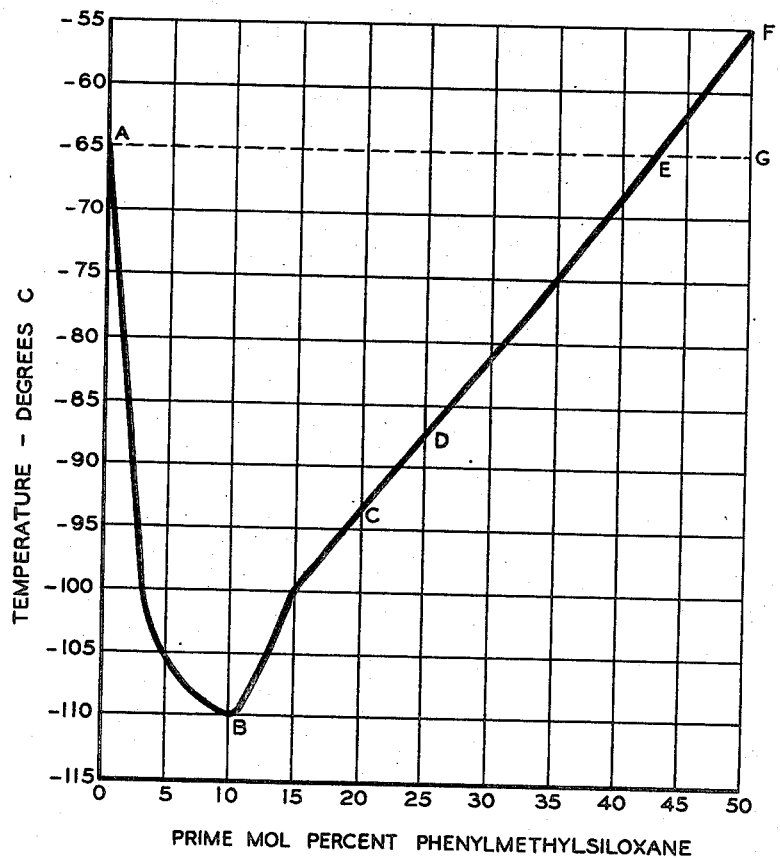

2,560,498

UNITED STATES PATENT OFFICE 2,560,498

COPOLYMERIC SILOXANE ELASTOMERS AND METHODS OF PRODUCING THEM

Earl Leathen Warrick, Pittsburgh, Pa., assignor, by mesne assignments, to Corning Glass Works, Corning, N. Y., a corporation of New York Application August 17, 1948, Serial No. 44,734

6 Claims. (Cl. 260—46.5)

This invention relates to new improved organopolysiloxane elastomers and to methods of producing them.

More particularly, the invention relates to silicone rubbers made from copolymers of dimethyl polysiloxanes and alkyl aryl polysiloxanes.

This application is a continuation-in-part of the inventor's copending application, Serial Number 557,056, filed October 3, 1944, now Patent Number 2,460,795, assigned to the Corning Glass Works.

Dimethylpolysiloxane elastomers are described in my above identified application. They possess a high degree of thermal stability, chemical inertness and good dielectric properties, which render them useful for applications for which organic elastomers such as natural and synthetic rubber are inapplicable. In spite of the many desirable properties of dimethylpolysiloxane elastomers, there are certain limitations to their usefulness. One of these is the fact that dimethylsiloxane elastomers become brittle at $-65°$ C. and therefore, fail to meet the requirements for elastomers to be used in Arctic operations. One of these requirements is that the elastomer remain flexible at a temperature of $-73°$ C. Other defects are that dimethylpolysiloxane elastomers deteriorate when in contact with dimethylpolysiloxane fluids, and that the dimethyl elastomers are inflammable.

It is an object of this invention to produce elastomers made from copolymers of dimethyl and alkyl aryl siloxanes which remain flexible at temperatures below $-65°$ C. Another object is to produce elastomers which will be applicable for use in the Arctic. Another object is to prepare elastomers which do not swell when in contact with dimethyl polysiloxane fluids. Another object is to prepare non-inflammable elastomers. Other objects and advantages will be apparent from the following description.

Elastomers are prepared, in accordance with this invention, from copolymers of between 50 and 99.5 prime mol percent dimethyl siloxane, and between 0.5 and 50 prime mol percent phenyl ethyl, phenyl methyl or tolyl methyl siloxane, said copolymer having a degree of polymerization of at least that of a copolymer of 8,000 c. s. viscosity. The steps of the process involve compound the copolymer with from 2 to 10 percent by weight of a diorgano peroxide, and if desired a filler, and vulcanizing the compounded material by heating it at a temperature above 110° C. for at least three minutes.

The copolymers within the purview of this invention are composed of between 50 and 99.5 prime mol percent dimethyl siloxane units and between 0.5 and 50 prime mol percent phenyl ethyl, phenyl methyl or tolyl methyl siloxane units. Prime mol percent is the number ratio of the siloxane units. The copolymer molecules are made up of alternate silicon and oxygen atoms and each silicon atom has two organic radicals attached thereto through silicon-carbon linkages. In the copolymer molecules, the siloxane units are of the type $(CH_3)_2SiO$ and $RR'SiO$ where R is a phenyl or tolyl radical and R' is a methyl or ethyl radical.

Copolymers of the above described type may be prepared by any appropriate method. Various methods are known in the art. For example, dimethyl and alkyl aryl silanes of the type $(CH_3)_2SiX_2$ and $RR'SiX_2$ where X is a hydrolyzable group such as halogen, alkoxy, aroxy and amino, may be co-hydrolyzed and co-condensed. Alternatively, the silanes may be hydrolyzed separately and the partially condensed siloxanes co-condensed by heating with or without a dehydration catalyst. Again, completely condensed cyclic dimethyl and alkyl aryl siloxanes may be interacted by heating them in the presence of a rearrangement catalyst. Another method is that disclosed in the copending application of James F. Hyde, Serial Number 760,710, filed July 12, 1947, assigned to the Corning Glass Works. In the Hyde application it is disclosed that organo silicon salts of the type

can be reacted with organo silicon halides of the type $RR'SiX_2$ to give copolymeric siloxanes and metal halides. The reaction is carried out under anhydrous conditions. Chain molecules are formed and the end valences thereof are satisfied by either a metal or halogen atom depending upon the proportion of reactants employed. The reaction product is washed with water until the washings are neutral and the resulting copolymers may be used to prepare elastomers in the manner described herein.

The elastomers of this invention may be prepared from dimethyl siloxane-alkyl aryl siloxane copolymers of a wide range of degree of polymerization. The degree of polymerization is the average number of monomer units in the copolymer molecules. The physical state of the copolymer qualitatively defines the degree of polymerization. Thus, if the degree of polymerization is low, the copolymer is a liquid. If the degree of polymerization is high, the copolymer is a tough resilient insoluble gel. As the degree of polymerization is increased the copolymers undergo a gradual change in physical state from soluble liquids of increasing viscosity through a partially soluble stringy semi-gel state to a tough resilient gel insoluble in benzene. Elastomers may be prepared from the copolymers of any degree of polymerization but it is preferred that the degree of polymerization be at least that of a copolymer of 8000 c. s. viscosity.

The copolymers defined above are compounded with from 2 to 10 percent of a diorgano peroxide. Aromatic acyl peroxides such as benzoyl peroxide and tertiary butyl perbonzoate are particularly effective. In general, any acyl peroxide which contains at least one aromatic acyl radical may be employed.

If a filler is used it may be present in amount from 0.25 part by weight filler per part of siloxane to three parts by weight filler per part siloxane. The compounding with a filler varies slightly depending upon the physical state of the copolymer. When the resilient insoluble gel is employed the compounding is best done on a rubber mill and the product is in the form of a stiff unvulcanized compounded rubber. When the degree of polymerization is such that the copolymer is a liquid or semi-gel a preliminary mix may be carried out in a dough mixer and then the material is milled. The resulting product is a paste.

Suitable fillers include inorganic materials such as asbestos, clay, silica aerogel, silica soot, fiber glass, iron oxide, bentonite, diatomaceous earth, precipitated calcium carbonate, alumina, zinc oxide, magnesia, lead oxide, titania, zirconia, carbon black and organic materials, such as cotton linters. The low temperature behavior of the elastomers of this invention is unaffected by the type or amount of filler employed.

The compounded insoluble gels and the pastes when vulcanized produce elastomers of equivalent properties.

The compounded copolymers are vulcanized by heating them at a temperature above 110° C. for at least three minutes. The temperature employed should obviously be below that at which destructive distillation of the siloxane will occur. As is known in the silicone rubber industry temperatures of from 110° C. to 400° C. are suitable for effecting the vulcanization. A tack free coherent elastomer is obtained by heating for at least three minutes. However, it is often desirable to further cure the elastomer by heating for a longer period of time at a temperature of from 110° to 250° C. Such an after cure usually improves the stress-strain properties of the rubbers.

The vulcanization process can be carried out in a variety of ways depending upon the product desired. When dense elastomeric products are needed the compounded copolymer is heated under conditions which prevent the expansion of the elastomer during vulcanization. One method of preventing expansion is to heat the material under pressure either in a mold or in an autoclave in contact with saturated steam.

Another method, which is eminently useful in the preparation of coated articles, is to apply a thin film of the compounded copolymer to a base member and heat at from 180° C. to 400° C. Under these conditions curing will take place in such a short time that a dense film is obtained without the application of pressure. When a sponge rubber is desired the vulcanization is effected with the allowance of room for expansion during the heating. The "foam elastomer" so produced is a coherent non-tacky product having a cellular structure.

Elastomers made from copolymeric siloxanes of the disclosed compositions are elastic, flexible, resilient materials having a tensile strength of at least 200 p. s. i. (pounds per square inch) and an elongation of at least 30 percent. All of the elastomer compositions of this invention are stable indefinitely at a temperature of 150° C. The low temperature behavior of the copolymeric elastomers varies with the concentration of alkyl aryl polysiloxane constituents. For a better understanding of this effect, recourse should be had to the accompanying drawing.

The drawing is a graph in which prime mol percent phenylmethylsiloxane is plotted on the horizontal grid scale and temperature in degrees centigrade is plotted on the vertical grid scale. In the drawing, the curve ABF shows the brittle points of copolymeric dimethylsiloxane-phenylmethylsiloxane elastomers. The dotted line AG represents the freezing point of dimethylsiloxane elastomers. The brittle points of those copolymeric siloxane elastomers which freeze below dimethyl siloxane elastomers are shown by the curve section ABE. Those elastomers whose brittle points fall on the section BC, are resistant to dimethyl polysiloxane fluids. The elastomers having brittle points along the section of the curve DF, are non-inflammable, while those having brittle points along the section DE possess both a freezing point below dimethyl elastomer and non-inflammability. The brittle points of all elastomers described in this invention were determined in accordance with the standard test D 736–43 T, ASTM, Part III B, Nonmetallic Materials (1946).

Elastomers made from copolymers of dimethyl and alkyl aryl siloxanes in which the concentration of the latter is from 0.5 to 42 prime mol percent possess, as can be seen from the line ABE of the drawing, superior low temperature stability to that of dimethylsiloxane elastomers. This is particularly true of those elastomers wherein the concentration of the alkyl aryl siloxane is from 1 to 35 prime mol percent. The latter compositions all possess brittle points below −73° C. Therefore, these materials meet the low temperature requirements set up for elastomers to be used in the Arctic, which requirement is that the elastomers shall have a brittle point below −73° C. Organic rubbers which are elastomers at room temperature will not even approach this figure. Dimethylpolysiloxane elastomers represent an improvement over all known rubbers but they too fail to meet this specification. The elastomers of this invention which have compositions containing from 1 to 35 prime mol percent alkyl aryl siloxane units more than meet the specification. Thus, the efficiency of vehicles and equipment requiring elastomeric parts has been greatly increased for Arctic operations.

It is well known that dimethyl polysiloxane fluids due to their thermal stability and low temperature-viscosity co-efficient are much better for use as damping media than other types of fluids. As has been pointed out, dimethyl polysiloxane elastomers deteriorate when in contact with the dimethyl fluids. For example, when dimethyl polysiloxane elastomer is immersed in a 1000 c. s. dimethyl polysiloxane fluid and heated at 300° F. for one week, the elastomer will undergo a volume increase of 15 percent. Under the same conditions, elastomers prepared from copolymers of between 80 and 90 prime mol percent dimethyl siloxane and between 10 and 20 prime mol percent of the herein defined alkyl aryl siloxanes, undergo little or no volume change. For example, in dimethylsiloxane-phenylmethylsiloxane elastomers when the concentration of phenyl methyl siloxane is 10 mol percent, the elastomer will swell only 4 percent after one week at 300° F. in the dimethyl fluid. If the concentration of phenyl methyl siloxane is 15 prime mol percent, the elastomer actually shrinks 0.7 percent from the above described treatment, while with 13 prime mol percent phenyl methyl siloxane the elastomer undergoes no volume change. Thus, whereas gaskets and hoses of dimethyl siloxane elastomer would soon leak when in contact with dimethylpolysiloxane fluids, the elastomers of this invention may be readily used for sealing systems containing the dimethyl fluids and for hoses to conduct such fluids.

One of the outstanding features of the elastomers of this invention is the fact that some of them are non-inflammable. The compositions in the non-inflammable range contain above 25 percent alkyl aryl siloxane. It is believed that this flame resistance property is due to the influence of aryl radicals. Flame resistance of the elastomeric compositions of this invention was determined according to the following test:

An extremely thin strip of the elastomer, ⅛ inch in width, 6 inches long and tapering to a point at one end, was held in a vertical position with the pointed end downward. A flame was held to the pointed end until the sample began to burn. The flame was then removed. If the material continued to burn until it was consumed, the material was said to be inflammable. If the sample extinguished itself immediately after removal of the flame it was considered to be non-inflammable. In accordance with this test, dimethylpolysiloxane elastomers are found to be inflammable. The copolymeric siloxane elastomers of this invention having less than 25 percent of the defined alkyl aryl siloxanes showed improved flame resistance over dimethylsiloxane elastomers. The copolymeric siloxane elastomers of more than 25 percent alkyl aryl siloxanes were found to be non-inflammable.

The elastomers of this invention having between 25 and 42 prime mol percent alkyl aryl siloxanes are of particular utility because they possess both greatly improved low temperature stability and the property of non-inflammability. The advantage of the latter property is obvious. One of the frequent causes of fires in electrical equipment or in vehicles containing such equipment is the ignition of the inflammable elastomeric insulating materials employed therein. Thus, the use of the non-inflammable elastomers of this invention will greatly reduce the fire hazard in equipment wherein these elastomers are employed. They are especially desirable for use on aircraft.

The elastomers disclosed herein can be used to fabricate a wide variety of products such as tubing, hoses, gaskets, coated articles, laminates, pads for handling hot objects, etc. Such articles are useful because of their thermal stability, good dielectric properties, chemical inertness, resistance to solvents and flame resistance.

For better understanding of this invention, reference may be had to the following examples which should be considered only as illustrative of the method thereof.

*Example 1*

A liquid copolymeric siloxane containing principally dimethyl silicon units with the remainder being essentially phenyl ethyl silicon units was thoroughly mixed with about three percent by weight of benzoyl peroxide in the form of "Luperco A" which contains about 23% benzoyl peroxide precipitated on calcium sulfate. The resulting mixture was heated at 150° C. for two hours whereupon a gel was formed which was quite elastic and tacky and which was insoluble in benzene. This gel was then milled with about 25 parts by weight of alkali-free asbestos per 100 parts of gel and three parts by weight of benzoyl peroxide (total benzoyl peroxide 6% based on weight of siloxane). The product had the consistency of dough. It was then poured into a mold from which oxygen was excluded, and heated for about a half hour at 150° C. At the end of this time the material had set to a non-tacky, elastic, rubbery product of high heat stability.

*Example 2*

A liquid copolymeric siloxane of about 8000 c. s. viscosity and having a composition of 90 prime mol percent dimethylsiloxane and 10 prime mol percent phenylethylsiloxane, was polymerized to a gel, insoluble in benzene, by heating the liquid copolymer was a 35 percent aqueous solution of KOH at a temperature of between 150° to 160° C. The potassium to silicon atomic ratio employed was 1 to 100. The gel was compounded by milling 100 parts gel, 100 parts TiO₂, 100 parts ZnO and 3.9 percent of benzoyl peroxide based on the weight of the gel. The compounded material was vulcanized by heating it at a temperature of 150° C. for 5 minutes. The coherent rubbery solid thus formed, was then heated at 250° C. for four hours. The elastomer had the following properties: tensile strength of 454 p. s. i., elongation of 145%, brittle point of −110° C.

*Example 3*

A fluid copolymer of about 5000 c. s. viscosity having a composition 90 prime mol percent dimethyl siloxane units and 10 prime mol percent phenyl methyl siloxane units was heated at 160° C. with 35% aqueous KOH solution in amount of 1 potassium atom to 100 silicon atoms. The heating was continued until a stiff resilient gel insoluble in benzene was obtained. The gel was compounded by milling 131 parts by weight gel, 262 parts titanium dioxide and 3 percent benzoyl perxoide based on the weight of the siloxane used. The compounded gel was vulcanized by heating at 110° C. for 5 minutes. The resulting product was a coherent rubbery solid having a tensile strength of 375 p. s. i., and elongation of 103 percent and a brittle point of −110° C.

*Example 4*

A liquid copolymer having the composition 15 prime mol percent phenyl methyl siloxane units and 85 prime mol percent dimethyl siloxane units was polymerized to a soft resilient gel by heating at 100° C. with 35% aqueous KOH solution in amount of 1 potassium atom per 1000 silicon atoms. The gel was compounded by milling 131 parts gel, 262 parts titanium dioxide and 3% of tertiary butyl perbenzoate based on the weight of the gel. The compounded mixture was vulcanized in an autoclave in an atmosphere of saturated steam at a pressure of 250 p. s. i. Within three minutes the material was converted into a rubbery coherent solid having a brittle point of $-100°$ C.

*Example 5*

A copolymeric siloxane of the composition shown in Example 3 was polymerized to a soft resilient gel by heating the copolymer with 35% aqueous KOH in amount of 1 K atom per 500 silicon atoms at a temperature of 85° C. The gel was stiffened to a tough gum insoluble in benzene by heating further at 200° C. The resulting gum was compounded by milling 190 parts gel, 190 parts titanium dioxide and 5% benzoyl peroxide based on the weight of the gel. The compounded gel was vulcanized by heating in a mold at a temperature of 150° C. for three minutes. An elastomer having a tensile of 400 p. s. i., an elongation of 100 percent and a brittle point of $-100°$ C.

*Example 6*

A liquid copolymeric siloxane of about 5000 c. s. viscosity having a composition 90 prime mol percent dimethyl siloxane units and 10 prime mol percent phenyl methyl siloxane units was polymerized by heating at 135° C. with 35% aqueous KOH in amount of 1 K atom per 2.0 silicon atoms, until the liquid reached a viscosity of 18,000 c. s. The fluid was then compounded by mixing in a dough mixer and finally milling on a five roll mill 182 parts fluid copolymer, 182 parts titanium dioxide and 10% benzoyl peroxide based on the weight of the fluid. The resulting paste was vulcanized by heating at a temperature of 200° C. for five minutes. The product was a rubbery coherent solid having a tensile strength of 350 p. s. i., and an elongation of 150%. The brittle point was $-110°$ C.

*Example 7*

A series of copolymeric siloxanes having compositions ranging from 99 prime mol percent dimethyl siloxane units and 1 prime mol percent phenyl methyl siloxane units to 50 prime mol percent dimethyl siloxane and 50 prime mol percent phenyl methyl siloxane was prepared and vulcanized as shown below.

In each case the desired amount of a phenyl methyl polysiloxane hydrolyzate of about 1000 c. s. viscosity was added to a mixture of cyclic dimethyl polysiloxane and 35% aqueous KOH solution. The alkali was present in amount of one K atom per 500 silicon atoms. During addition of the phenyl methyl siloxane the temperature was maintained between 130–135° C. After about 40 minutes a homogeneous fluid of about 5000 c. s. viscosity was obtained. The temperature was then raised to 160° C. and heating was continued until a gel resulted.

The gel obtained from each run was compounded by milling 131 parts gel, 262 parts titanium dioxide and 3 percent benzoyl peroxide based on the weight of the gel. The compounded material was vulcanized by heating at 150° C. until a coherent rubbery solid was obtained. A control run was made using pure dimethyl siloxane cyclics. A comparison of the properties of the dimethyl elastomer and the various copolymeric dimethyl siloxane phenyl methyl siloxane elastomers is shown in Table 1.

TABLE 1

| Composition of Elastomer | | Tensile in p. s. i. | Elongation, Per Cent | Brittle Pt., ° C. |
|---|---|---|---|---|
| Prime Mol Per Cent (CH$_3$)$_2$SiO | Prime Mol Per Cent C$_6$H$_5$CH$_3$SiO | | | |
| 100 | 0 | 481 | 115 | −65 |
| 99 | 1 | 475 | 120 | −75 |
| 98 | 2 | 395 | 150 | −85 |
| 97 | 3 | 450 | 145 | −100 |
| 95 | 5 | 445 | 130 | −105 |
| 90 | 10 | 425 | 135 | −110 |
| 85 | 15 | 425 | 115 | −100 |
| 65 | 35 | 450 | 150 | −75 |
| 50 | 50 | 227 | 186 | −55 |

The above runs were repeated using various fillers such as zinc oxide and other similar materials and with an amount of vulcanizing agent ranging from 2 to 10 percent based on the weight of the gel. It was found the brittle points of the elastomers were unaffected by the type of filler used and the amount of vulcanizing agent employed.

*Example 8*

Two copolymeric siloxanes having the compositions 90 prime mol percent dimethyl siloxane and 10 prime mol percent phenyl methyl siloxane, and 85 prime mol percent dimethyl siloxane and 15 prime mol percent phenyl methyl siloxane respectively, were each converted into elastomers in accordance with the procedure of Example 7. The effect of dimethyl polysiloxane fluids upon the elastomers so prepared was determined in the following manner. Samples of the two elastomers were immersed in 1000 c. s. dimethyl polysiloxane fluid and held for one week at a temperature of 300° F. The volume increase in the samples after such treatment was measured and a control run was made using dimethyl siloxane elastomer. The results are shown in the Table II.

TABLE II

| Composition of Elastomer | | Per Cent Volume Increase |
|---|---|---|
| prime mol per cent (CH$_3$)$_2$SiO | prime mol per cent CH$_3$(C$_6$H$_5$)SiO | |
| 100 | 0 | 15 |
| 90 | 10 | 4 |
| 85 | 15 | −0.7 |

The elastomer containing 15 prime mol percent phenyl methyl siloxane showed a slight shrinkage.

*Example 9*

Dimethylsiloxane phenylmethylsiloxane copolymers having the compositions shown in Table III were each converted into an elastomer according to the method of Example 7. From each elastomer sample so prepared, a thin sliver ⅛″ wide at one end, 6 inches long and tapered to a point at the other end, was cut. These slivers were clamped in a vertical position and the inflammability of each was determined in accordance with the test previously described. A control test was made with dimethylpolysiloxane elastomer. The results are shown in the table below.

TABLE III

| Prime Mol Per Cent Dimethylsiloxane | Prime Mol Per Cent Phenylmethylsiloxane | Result |
|---|---|---|
| 100 | 0 | inflammable. |
| 90 | 10 | slightly inflammable. |
| 75 | 25 | non-inflammable. |
| 65 | 35 | Do. |
| 50 | 50 | Do. |

*Example 10*

A copolymeric siloxane of the composition 98 prime mol percent dimethyl siloxane units and 2 prime mol percent phenyl methyl polysiloxane having a viscosity of about 2000 c. s. was polymerized by heating it with 35% aqueous KOH solution in amount of 1 potassium atom per 250 silicon atoms, at a temperature of 140° c. until the viscosity reached 13,000 c. s. The liquid copolymer was mixed in the proportion of 100 parts liquid, 100 parts titanium dioxide, 100 parts zinc oxide and 5% benzoyl peroxide based on the weight of the siloxane fluid. The resulting paste was vulcanized by heating at 300° C. for three minutes. The product was a tack free rubbery solid having a tensile strength of 350 p. s. i., an elongation of 100 percent and a brittle point of —85° C.

*Example 11*

A liquid copolymeric siloxane having the composition 65 prime mol percent dimethyl siloxane and 35 prime mol percent phenyl methyl siloxane was polymerized by heating at 160° C. with 35% aqueous KOH solution in amount of 1 potassium atom per 500 silicon atoms until a semi-gel was obtained. The semi-gel was partially soluble in benzene, it flowed at room temperature and exhibited some elastic recovery when stretched. The material was compounded by mixing 100 parts semi-gel, 200 parts titanium dioxide and 3 percent benzoyl peroxide based on the weight of the siloxane. The compounded material was vulcanized by heating at 150° C. until a coherent rubbery solid was obtained. The elastomer had a tensile strength of 400 p. s. i., elongation of 125 percent and a brittle point of —75° C.

*Example 12*

A liquid copolymer of about 5000 c. s. viscosity having a composition of 90 prime mol percent dimethylsiloxane and 10 prime mol percent tolyl methyl siloxane was polymerized to a soft resilient gel by heating the copolymer with 35% aqueous KOH solution at a temperature between 135° C. and 160° C. The alkali was present in amount of one K atom per 100 silicon atoms. The gel was compounded by milling 100 parts gel with 100 parts titanium dioxide, 100 parts zinc oxide and 3 percent benzoyl peroxide based on the weight of the gel. The compounded material was vulcanized by heating it in a pressure mold at 150° C. for three minutes. The product thereby obtained was a coherent rubbery solid having a tensile strength of 425 p. s. i., an elongation of 150 percent and a brittle point of —85° C.

That which is claimed is:

1. The process of preparing new synthetic materials from a copolymer composed principally of dimethylsiloxane units, the remainder being siloxane units containing one alkyl radical of less than three carbon atoms attached to each silicon atom and one monocyclic aryl hydrocarbon radical attached to each silicon atom, which process comprises compounding the copolymeric siloxane with from 2 to 10 per cent based on the weight of the siloxane of an acyl peroxide containing at least one aromatic acyl radical, and vulcanizing the compounded material by heating it at a temperature and for a time sufficient to form a coherent non-tacky elastomer.

2. A heat curable composition of matter comprising a copolymeric siloxane composed principally of dimethylsiloxane units the remainder being siloxane units having one alkyl radical of less than three carbon atoms attached to each silicon atom and one monocyclic aryl hydrocarbon radical attached to each silicon atom, and from 2 to 10 per cent based on the weight of the siloxane of an acyl peroxide having at least one aromatic acyl group.

3. A heat curable composition of matter comprising a copolymeric siloxane composed principally of dimethylsiloxane units the remainder being siloxane units having one alkyl radical of less than three carbon atoms attached to each silicon atom and one monocyclic aryl hydrocarbon radical attached to each silicon atom, a filler and from 2 to 10 per cent based on the weight of the siloxane of an acyl peroxide having at least one aromatic acyl group.

4. A copolymeric siloxane elastomer having elongation at break of at least 30 per cent and a tensile strength of at least 200 p. s. i., which comprises a copolymeric siloxane composed principally of dimethylsiloxane units the remainder being siloxane units containing at least one alkyl radical of less than three carbon atoms attached to each silicon atom and one monocyclic aryl hydrocarbon radical attached to each silicon atom, and a filler.

5. A composition of matter in accordance with claim 2 in which the peroxide is benzoyl peroxide.

6. A composition of matter in accordance with claim 3 in which the peroxide is benzoyl peroxide.

EARL LEATHEN WARRICK.

REFERENCES CITED

The following references are of record in the file of this patent:

UNITED STATES PATENTS

| Number | Name | Date |
|---|---|---|
| 2,371,050 | Hyde | Mar. 6, 1945 |
| 2,377,689 | Hyde | June 5, 1945 |
| 2,448,565 | Wright | Sept. 7, 1948 |
| 2,484,595 | Sprung | Oct. 11, 1949 |
| 2,486,162 | Hyde | Oct. 25, 1949 |

OTHER REFERENCES

Barron, Modern Synthetic Rubbers Van Nostrand, 1944, pp. 44 to 46.